United States Patent
Ogawa (10) Patent No.: US 12,485,993 B2
(45) Date of Patent: Dec. 2, 2025

(54) STRADDLED ELECTRIC VEHICLE

(71) Applicant: YAMAHA HATSUDOKI KABUSHIKI KAISHA, Iwata (JP)

(72) Inventor: Soraki Ogawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 713 days.

(21) Appl. No.: 17/864,594

(22) Filed: Jul. 14, 2022

(65) Prior Publication Data

US 2023/0026390 A1    Jan. 26, 2023

(30) Foreign Application Priority Data

Jul. 20, 2021  (JP) ................................. 2021-119981

(51) Int. Cl.
| B62J 45/00 | (2020.01) |
| B60L 53/16 | (2019.01) |
| B62J 43/16 | (2020.01) |
| B62K 11/00 | (2006.01) |

(52) U.S. Cl.
CPC .............. B62K 11/00 (2013.01); B60L 53/16 (2019.02); B62J 43/16 (2020.02); B62J 45/00 (2020.02)

(58) Field of Classification Search
CPC .......... B60L 53/22; B60L 53/18; B60L 53/16; B62J 45/00
See application file for complete search history.

(56) References Cited

U.S. PATENT DOCUMENTS

| 5,545,046 | A | 8/1996 | Masuda et al. |
| 6,624,610 | B1 | 9/2003 | Ono et al. |
| 9,956,883 | B2 * | 5/2018 | Kawabata ................ B62J 43/16 |
| 11,230,203 | B2 * | 1/2022 | Ghannam ............... B60L 53/66 |
| 2012/0197470 | A1 | 8/2012 | Inui |
| 2013/0257374 | A1 | 10/2013 | Ichikawa et al. |
| 2015/0291046 | A1 | 10/2015 | Kawabata |
| 2022/0407320 | A1 * | 12/2022 | Filice .................. H01M 50/249 |

FOREIGN PATENT DOCUMENTS

| CN | 204895169 U | 12/2015 |
| JP | 2000-253591 A | 9/2000 |
| JP | 2013-203149 A | 10/2013 |
| JP | 5627154 B2 | 11/2014 |
| WO | 2019/193023 A1 | 10/2019 |

OTHER PUBLICATIONS

Official Communication issued in corresponding European Patent Application No. 22186017.4, mailed on Dec. 20, 2022.
Official Communication issued in corresponding Indian Patent Application No. 202224041042, mailed on Jul. 28, 2023.

* cited by examiner

*Primary Examiner* — Valentin Neacsu
*Assistant Examiner* — Hosam Shabara
(74) *Attorney, Agent, or Firm* — Keating & Bennett, LLP (57) ABSTRACT

A straddled electric vehicle includes a wheel, an electric motor to drive the wheel, a battery to supply electric power to the electric motor, a DC charging port to receive a DC current output from a first external power source, and an AC charging port to receive an AC current output from a second external power source. A first distance between the DC charging port and the battery is smaller than a second distance between the AC charging port and the battery.

8 Claims, 9 Drawing Sheets

STRADDLED ELECTRIC VEHICLE

CROSS REFERENCE TO RELATED APPLICATIONS

This application claims the benefit of priority to Japanese Patent Application No. 2021-119981 filed on Jul. 20, 2021. The entire contents of this application are hereby incorporated herein by reference.

BACKGROUND OF THE INVENTION

1. Field of the Invention

The present invention relates to a straddled electric vehicle that travels using an electric motor.

2. Description of the Related Art

There are straddled electric vehicles that travel using an electric motor as their driving source (see, for example, Japanese Laid-Open Patent Publication No. 2000-253591). The electric motor rotates with electric power which is supplied from a battery installed in such a vehicle. As the rotation of the electric motor is transmitted to the wheels, the vehicles are able to travel.

In order to charge the battery installed in a straddled electric vehicle, a charging port at which a connector of an external power source is detachable may be provided for the vehicle. However, in a straddled electric vehicle, a large number of components need to be disposed within a limited space within the vehicle body. Thus, it is not easy to secure a space in which to dispose the charging port and a harness extending from the charging port.

SUMMARY OF THE INVENTION

Preferred embodiments of the present invention provide straddled electric vehicles each including a plurality of charging ports.

A straddled electric vehicle according to a preferred embodiment of the present invention includes a wheel, an electric motor to drive the wheel, a battery to supply electric power to the electric motor, a DC charging port to receive a connector provided on a cable extending from a first external power source to output a DC current to charge the battery, and an AC charging port to receive a connector provided on a cable extending from a second external power source to output an AC current to charge the battery.

A first distance between the DC charging port and the battery is shorter than a second distance between the AC charging port and the battery.

A straddled electric vehicle according to a preferred embodiment of the present invention includes two kinds of charging ports, that is, the DC charging port and the AC charging port. Generally, a DC current to be output from an external power source is used for rapid charging, such that a large current flows during the charging. For this reason, a thick harness having a large cross-sectional area is used as a harness that connects the DC charging port and the battery to each other. Since the DC charging port is located near the battery, the harness with a large cross-sectional area is shortened, and the space required to accommodate the harness is reduced. In the straddled electric vehicle, a large number of components need to be provided within a limited space in a vehicle body. Thus, space saving is significantly advantageous. In addition, since the harness having a large cross-sectional area is shortened, weight reduction and cost reduction are achieved.

In a preferred embodiment of the present invention, the battery may have a battery casing, and the harness extending from the DC charging port may be directly inserted in the battery casing.

Generally, connectors that are able to deliver a large current are expensive. Since no connector is provided to connect the harness extending from the DC charging port and the battery to each other, cost reduction is achieved.

In a preferred embodiment of the present invention, the battery may have the battery casing, wherein along a vehicle front-rear direction, the DC charging port may be between a front end portion of the battery casing and a rear end portion of the battery casing, and along the vehicle front-rear direction, the AC charging port may be forward of the front end portion of the battery casing, or rearward of the rear end portion of the battery casing.

Since the DC charging port is near the battery, any harness with a large cross-sectional area is able to be shortened, and the space required to accommodate the harness is reduced.

Since the DC charging port and the AC charging port are spaced apart from each other, a rider is able to easily distinguish the two kinds of charging ports from each other. With this, for example, erroneous insertion of the charging connectors is significantly reduced or prevented.

In a preferred embodiment of the present invention, a straddled electric vehicle may further include a body frame including a head pipe, wherein along the vehicle front-rear direction, the AC charging port may be forward of the head pipe, and along the vehicle front-rear direction, the DC charging port may be rearward of the head pipe.

Since the DC charging port and the AC charging port are spaced apart from each other, the rider is able to easily distinguish the two kinds of charging ports from each other. With this, for example, erroneous insertion of the charging connectors is significantly reduced or prevented.

In addition, during a parking maneuver, the straddled electric vehicle is parked generally by being advanced into a parking space. Since the AC charging port is located at the front side of the straddled electric vehicle, the charging connector installed in the parking space is able to be easily connected to the AC charging port.

In a preferred embodiment of the present invention, a straddled electric vehicle may further include a first footboard on which the rider is able to rest a left foot, a second footboard on which the rider is able to rest a right foot, and a body cover including a center tunnel portion between the first footboard and the second footboard along a vehicle width direction, wherein the battery may be located in the center tunnel portion, and the DC charging port may be provided on an outer surface side of the center tunnel portion.

Since the DC charging port is near the battery, assembly of the DC charging port and the battery is reduced. With this, both the battery and the DC charging port are easily located in the center tunnel portion.

The center tunnel portion is located at a position that is accessible to the rider. Since the DC charging port is in the center tunnel portion, the rider is able to easily charge the straddle electric vehicle.

In a preferred embodiment of the present invention, a straddled electric vehicle may further include a front cowl to cover a portion of a vehicle front portion, and the AC charging port may extend through the front cowl.

During a parking maneuver, the straddled electric vehicle is parked generally by being advanced into the parking space. Since the AC charging port is located at a relatively high position on the vehicle front portion, the charging connector installed in the parking space is easily connected to the AC charging port.

In a preferred embodiment of the present invention, the battery may include the battery casing, wherein along the vehicle front-rear direction, the AC charging port may be forward of the front end portion of the battery casing, and along the vehicle front-rear direction, the DC charging port may be rearward of the front end portion of the battery casing.

Since the DC charging port and the AC charging port are spaced apart from each other, the rider is able to easily distinguish the two kinds of charging ports from each other. With this, for example, erroneous insertion of the charging connectors is significantly reduced or prevented.

In addition, during a parking maneuver, the straddled electric vehicle is parked generally by being advanced into the parking space. Since the AC charging port is located at the front side of the straddled electric vehicle, the charging connector installed in the parking space is easily connected to the AC charging port.

In a preferred embodiment of the present invention, the straddled electric vehicle may further include a seat on which the rider is able to sit, wherein along the vehicle front-rear direction, the DC charging port may be forward of a front end portion of the seat, and along the vehicle front-rear direction, the AC charging port may be rearward of the front end portion of the seat.

Since the DC charging port and the AC charging port are spaced apart from each other, the rider is able to easily distinguish the two kinds of charging ports from each other. With this, for example, erroneous insertion of the charging connectors is significantly reduced or prevented.

In a preferred embodiment of the present invention, a straddled electric vehicle may further include an onboard charger to convert the AC current received by the AC charging port to a DC current, and output the DC current to the battery.

With this, the battery is able to be charged by using the AC current received by the AC charging port.

A straddled electric vehicle according to a preferred embodiment of the present invention includes two kinds of charging ports, that is, the DC charging port and the AC charging port. Generally, a DC current to be output from an external power source is used for rapid charging, such that a large current flows during the charging. For this reason, the thick harness having the large cross-sectional area is used as the harness that connects the DC charging port and the battery to each other. Since the DC charging port is located near the battery, the harness with a large cross-sectional area is shortened, and the space required to accommodate the harness is reduced. In the straddled electric vehicle, a large number of components need to be provided within the limited space in the vehicle body. Thus, space saving is significantly advantageous. In addition, since the harness having a large cross-sectional area is shortened, weight reduction and cost reduction are achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinbelow, with reference to the attached drawings, preferred embodiments of the present invention are described. Like components are denoted by like reference numerals, and redundant description of such components is omitted. In the following description, the front, rear, top, bottom, right, and left correspond respectively to the front, rear, top, bottom, right, and left as viewed from a rider seated on a seat of an electric vehicle. Note that the preferred embodiments described hereinbelow are merely examples, and thus the present invention is not limited to the preferred embodiments described below.

Figure 1:
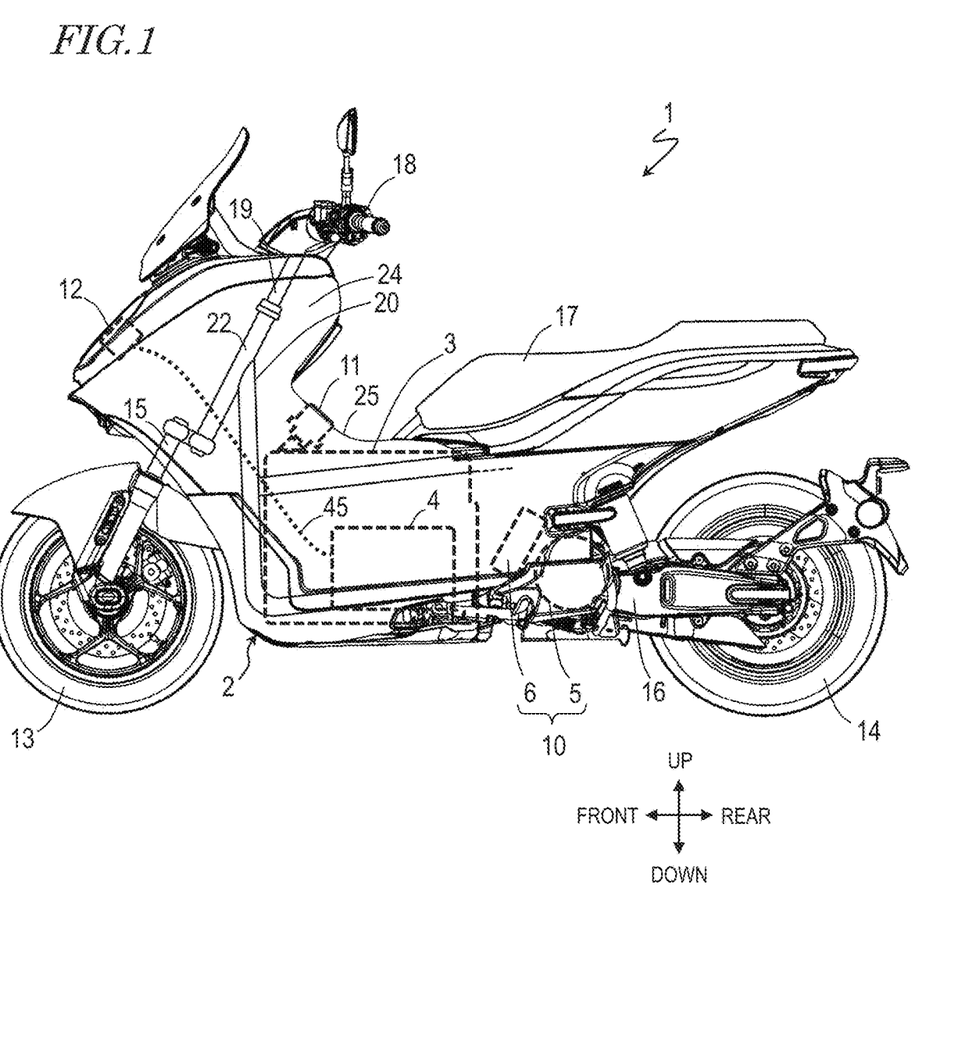
FIG. 1 is a left side view illustrating a straddled electric vehicle 1 according to a preferred embodiment of the present invention.

FIG. 1 is a left side view illustrating a straddled electric vehicle 1 according to a preferred embodiment of the present invention. In the example illustrated in FIG. 1, the straddled electric vehicle 1 is a two-wheeled electric vehicle of a scooter type. Note that the straddled electric vehicle 1 is not limited to the scooter-type two-wheeled electric vehicle exemplified herein. The straddled electric vehicle 1 may be two-wheeled electric vehicles of other types such as what is called an on-road type, an off-road type, and a moped type. A straddled electric vehicle refers to an arbitrary vehicle that the rider rides in a straddling manner, and thus is not limited to two-wheeled vehicles. The straddled electric vehicle 1 may be a three-wheeled vehicle (LMW) of a type whose direction of travel is changed as the vehicle body is tilted, etc., or any other straddled electric vehicle such as an ATV (All Terrain Vehicle). The straddled electric vehicle 1 may be a vehicle with four or more wheels.

As illustrated in FIG. 1, the two-wheeled electric vehicle 1 includes a vehicle body 2, a battery 3, an onboard charger 4, a drive unit 10, a front wheel 13, and a rear wheel 14. For ease of understanding of the configuration of the two-wheeled electric vehicle 1, FIG. 1 illustrates portion of the interior of the two-wheeled electric vehicle 1 in a see-through manner.

The vehicle body 2 has a structure including a body frame 20 and a body cover 24. The body frame 20 includes a head pipe 22. A steering shaft 19 is inserted in the head pipe 22. Front forks 15 are provided at a lower end of the steering shaft 19. The front forks 15 are capable of turning to the right and left about the steering shaft 19 inserted in the head pipe 22. The front wheel 13 is rotatably supported at lower end portions of the front forks 15. A steering handle 18 is provided at an upper end of the steering shaft 19.

A rear portion of the vehicle body 2 swingingly supports a swingarm 16. The rear wheel 14 is rotatably supported by the swingarm 16. In this example, the rear wheel 14 is a drive wheel, and the front wheel 13 is a driven wheel. A seat 17 on which the rider is seated is provided at an upper portion of the vehicle body 2.

The battery 3 is between the front wheel 13 and the rear wheel 14 along the front-rear direction of the vehicle 1. The drive unit 10 is rearward of the battery 3. The drive unit 10 includes an electric motor 5 and a motor control unit (MCU) 6 that controls operation of the electric motor 5. The battery 3 supplies electric power to activate the electric motor 5. The MCU 6 generates a driving current from an output current of the battery 3, and outputs this driving current to the electric motor 5. Rotation caused by the electric motor 5 is transmitted to the rear wheel 14 via, for example, a motive power transmission mechanism of a belt-drive type, such that the vehicle 1 travels. The rotation caused by the electric motor 5 may be transmitted to the rear wheel 14 via a motive power transmission mechanism of a chain-drive type or a shaft-drive type.

Figure 2:
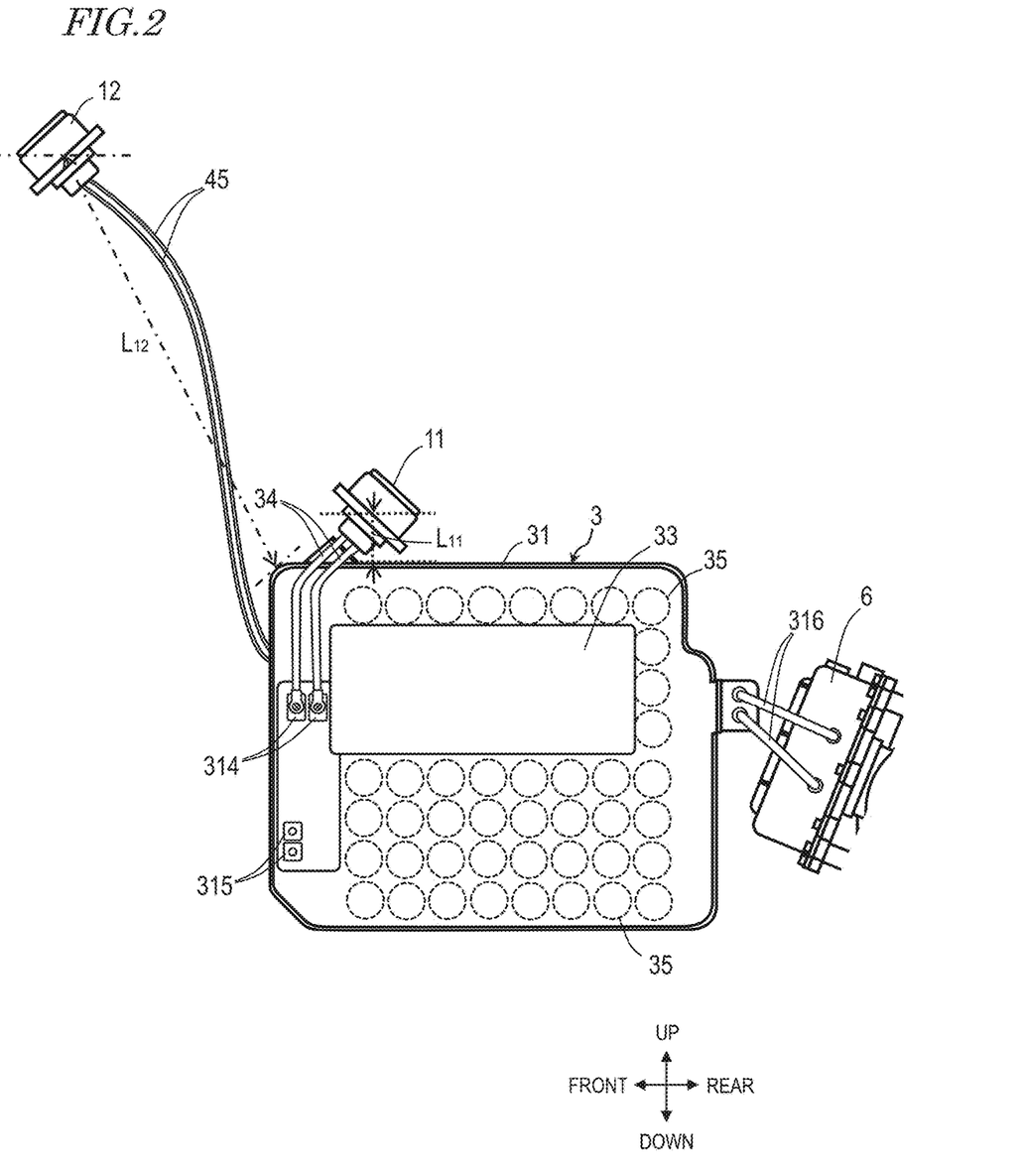
FIG. 2 is a left side view illustrating a battery 3, an MCU 6, a DC charging port 11, and an AC charging port 12 according to a preferred embodiment of the present invention.

A DC charging port 11 is provided above the battery 3. An AC charging port 12 is provided in a front portion of the vehicle body 2. FIG. 2 is a left side view illustrating the battery 3, the MCU 6, the DC charging port 11, and the AC charging port 12. FIG. 2 illustrates the interior of the battery 3.

The DC charging port 11 includes a receptacle at which a connector (plug) of an external power source that outputs a DC current for charging the battery 3 is detachable. The DC charging port 11 receives the DC current output from the external power source. The DC charging port 11 is connected to the battery 3 via a harness 34. When charging the battery 3, the DC current output from the external power source is supplied to the battery 3 through the DC charging port 11, such that the battery 3 is charged.

Figure 3:
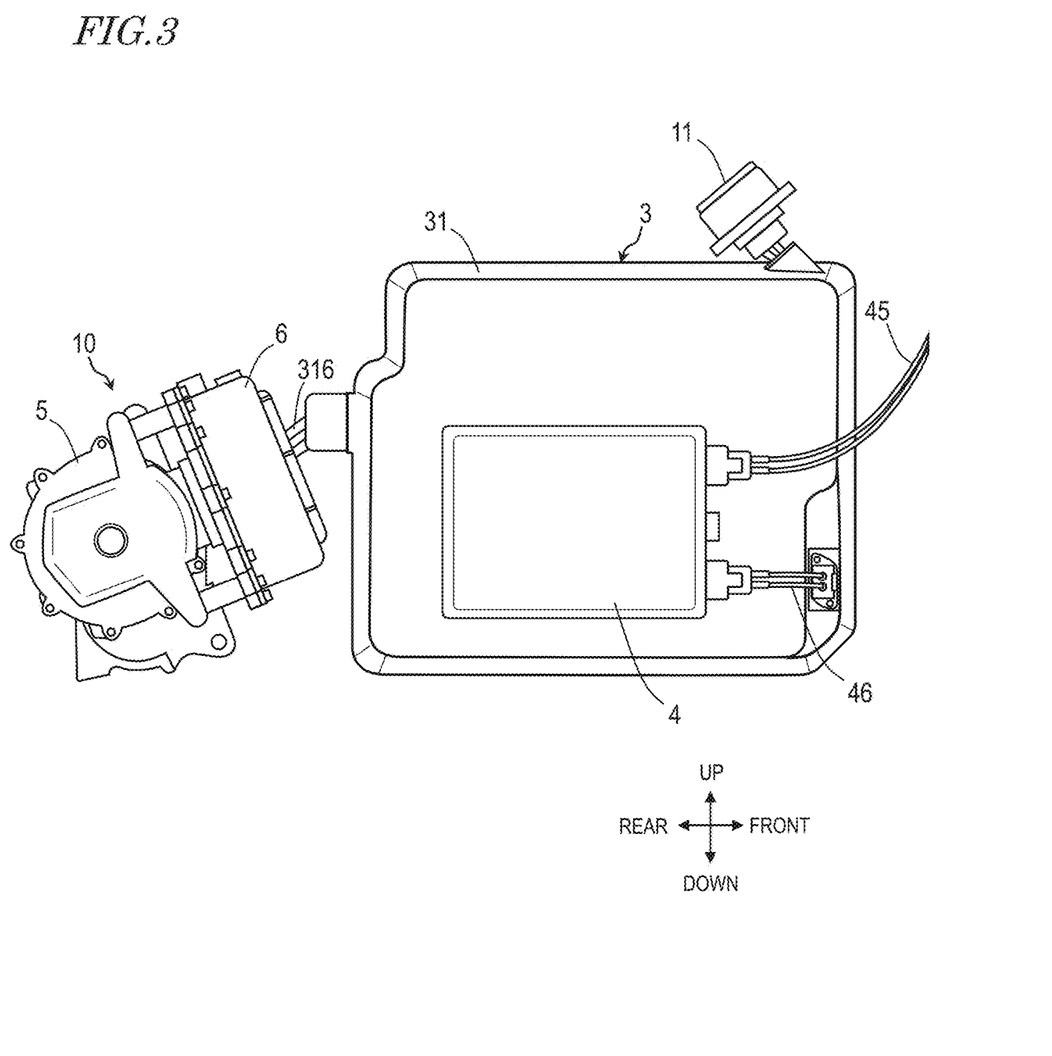
FIG. 3 is a right side view illustrating the battery 3, an onboard charger 4, a motor 5, the MCU 6, and the DC charging port 11 according to a preferred embodiment of the present invention.

The onboard charger 4 is disposed to the right of the battery 3. FIG. 3 is a right side view illustrating the battery 3, the onboard charger 4, a motor 5, the MCU 6, and the DC charging port 11. With reference to FIG. 1, the AC charging port 12 is provided in the front portion of the vehicle body 2. The AC charging port 12 includes a receptacle at which another connector (plug) of another external power source that outputs an AC current for charging the battery 3 is detachable. The AC charging port 12 receives the AC current output from the other external power source. The AC charging port 12 is connected to the onboard charger 4 via a harness 45. When charging the battery 3, the AC current output from the other external power source is supplied to the onboard charger 4 through the AC charging port 12. The onboard charger 4 converts the AC current to a DC current, and outputs the DC current to the battery 3, such that the battery 3 is charged. The DC current output by the onboard charger 4 is supplied to the battery 3 via, for example, a harness 46 (FIG. 3).

Figure 4:
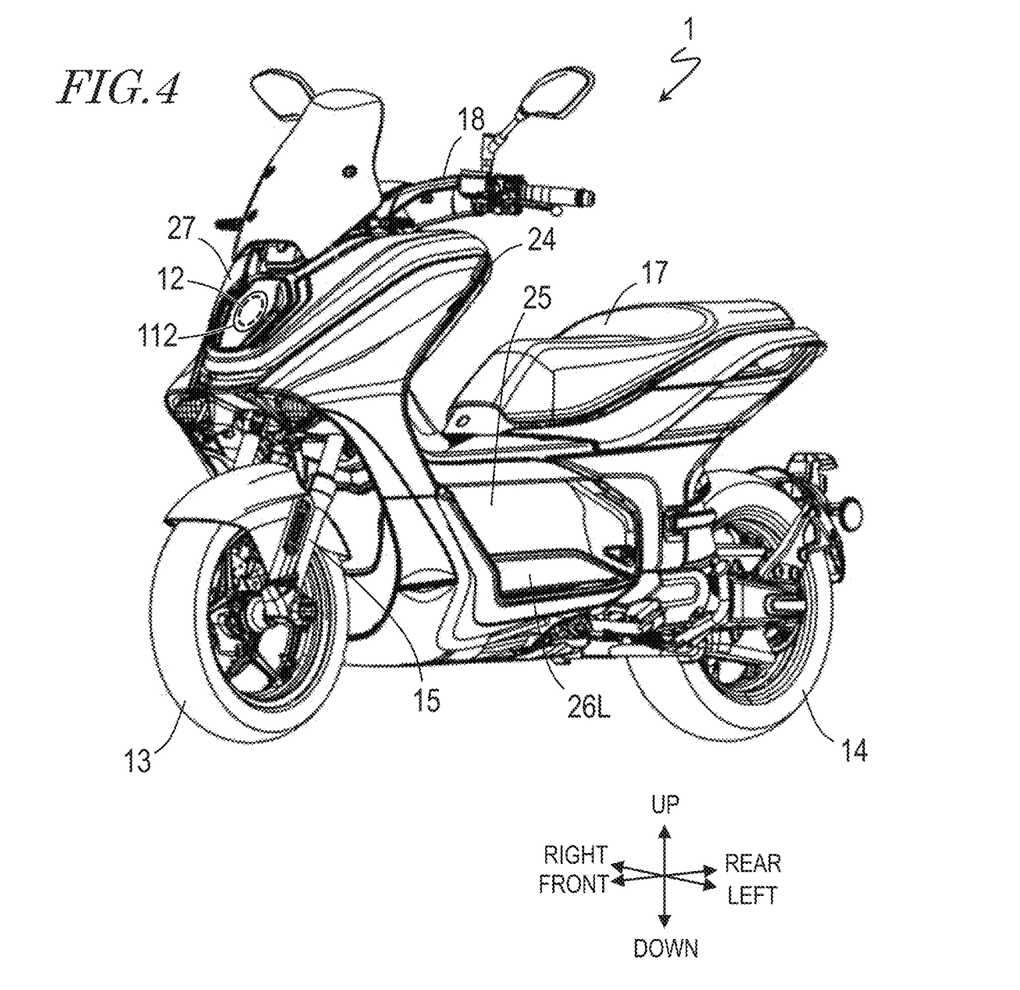
FIG. 4 is a perspective view in which a straddled electric vehicle 1 according to a preferred embodiment of the present invention is viewed obliquely from the front left side.
Figure 5:
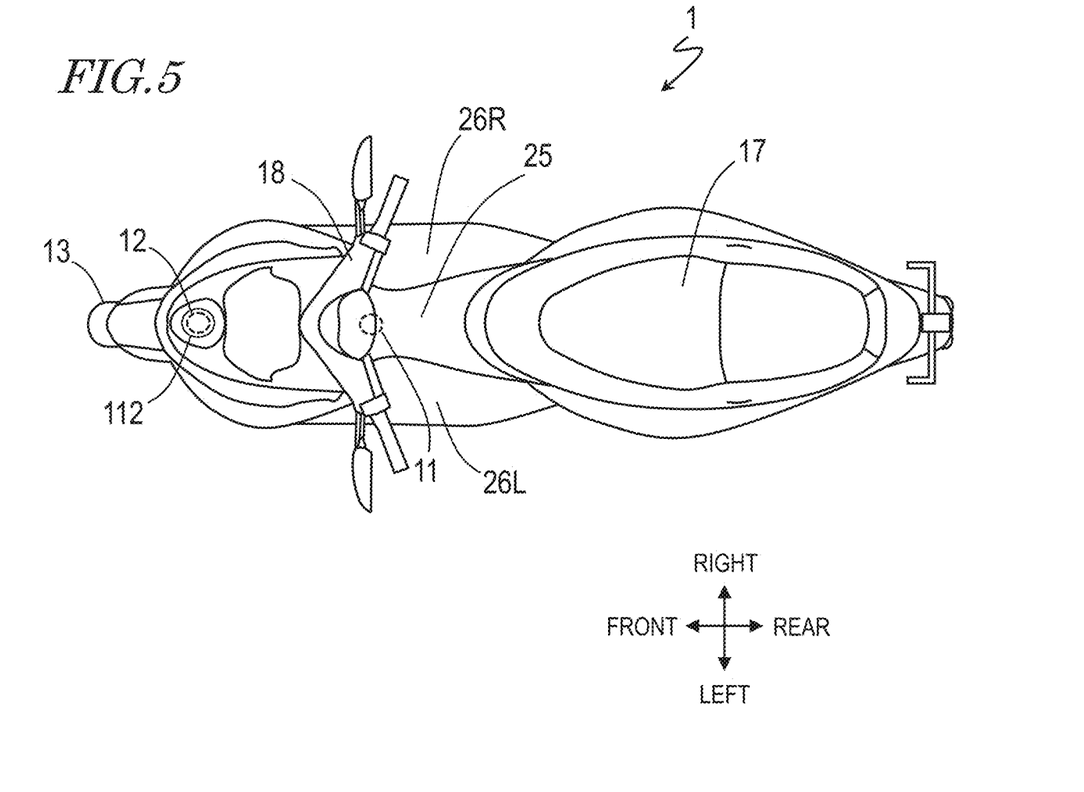
FIG. 5 is a top view illustrating a straddled electric vehicle 1 according to a preferred embodiment of the present invention.

FIG. 4 is a perspective view in which the two-wheeled electric vehicle 1 is viewed obliquely from the front left side. FIG. 5 is a top view illustrating the two-wheeled electric vehicle 1.

Footboards 26L and 26R are located between the front wheel 13 and the rear wheel 14 along the front-rear direction of the vehicle body 2. The footboard 26L, which is a footboard on which a rider rests his/her left foot, is located on a left-hand side along the vehicle width direction (right-left direction) of the vehicle body 2. The footboard 26R, which is a footboard on which a rider rests his/her right foot, is located on a right-hand side along the vehicle width direction of the vehicle body 2.

The body cover 24 includes a center tunnel portion 25 located between the footboard 26L and the footboard 26R along the vehicle width direction. The center tunnel portion 25 has a shape expanding upward relative to the footboard 26L and the footboard 26R between the footboards 26L and 26R. With reference to FIG. 1, in a preferred embodiment of the present invention, the battery 3 is located in the center tunnel portion 25. The DC charging port 11 is exposed from an upper outer surface of the center tunnel portion 25.

The AC charging port 12 is provided in the front portion of the vehicle body 2. The body cover 24 includes a front cowl 27 (FIG. 4) that covers a portion of the front portion of the two-wheeled electric vehicle 1. In a preferred embodiment of the present invention, the AC charging port 12 extends through the front cowl 27. The AC charging port 12 is provided with a cover 112 that prevents intrusion of rainwater and dust. The DC charging port 11 is also provided with a cover that prevents the intrusion of rainwater and dust.

With reference to FIG. 2, the battery 3 includes a plurality of battery cells 35, and a battery casing 31 that houses the plurality of battery cells 35. The battery casing 31 also houses a battery management system (BMS) 33 and electrode terminals 314 and 315. The harness 34 extending from the DC charging port 11 is connected to the electrode terminals 314. The harness 46 extending from the onboard charger 4 (FIG. 3) is connected to the electrode terminals 315.

The BMS 33 controls charging operation and discharging operation of the battery 3. Switching between the charging and the discharging of the battery 3, and switching of the current to be used for the charging are able to be made, for example, in response to switching of a relay switch by the BMS 33. When charging by inputting a DC current, the BMS 33 performs control to supply a current that is input through the DC charging port 11 and via the harness 34 to the plurality of battery cells 35. When charging by inputting an AC current, the BMS 33 performs control to supply a current that is input from the onboard charger 4 via the harness 46 to the plurality of battery cells 35. When a current is output from the battery 3 to the MCU 6, the BMS 33 performs control to cause the plurality of battery cells 35 to output currents. The current output from the battery 3 is supplied to the MCU 6 via a harness 316.

In a preferred embodiment of the present invention, the DC charging port 11 is located relatively near the battery 3, and the AC charging port 12 is located relatively far from the battery 3. When a distance between the DC charging port 11 and the battery 3 is a first distance $L_{11}$, and when a distance between the AC charging port 12 and the battery 3 is a second distance $L_{12}$, the first distance $L_{11}$ is shorter than the second distance $L_{12}$. In this case, the first distance $L_{11}$ is, for example, the shortest distance from a center position of the DC charging port 11 to the battery casing 31. The second distance $L_{12}$ is, for example, the shortest distance from a center position of the AC charging port 12 to the battery casing 31.

The first distance $L_{11}$ may be the shortest distance from an end portion of the harness 34 on the side where the DC charging port 11 exists to the battery casing 31. In this case, the second distance Ln can be the shortest distance from an end portion of the harness 45 on the side where the AC charging port 12 exists to the battery casing 31.

Generally, a DC current to be output from an external power source is used for rapid charging, such that a large current flows during the charging. For this reason, a thick harness having a large cross-sectional area is used as the harness 34 that connects the DC charging port 11 and the battery 3 to each other. Since the DC charging port 11 is located near the battery 3, the harness 34 with a large cross-sectional area is shortened, and the space required to accommodate the harness 34 is reduced. In the straddled electric vehicle 1, a large number of components need to be provided within a limited space in the vehicle body. Thus, space saving is significantly advantageous. In addition, since the harness 34 having a large cross-sectional area is shortened, weight reduction and cost reduction are achieved.

Further, in a preferred embodiment of the present invention, the harness 34 extending from the DC charging port 11 is not connected to the battery 3 via a connector, but directly inserted in the battery casing 31. Generally, connectors capable of delivering a large current are expensive. Since no connector is provided to connect the harness 34 extending from the DC charging port 11 and the battery 3 to each other, cost reduction is achieved.

Since the DC charging port 11 is located near the battery 3, assembly of the DC charging port 11 and the battery 3 is reduced. With this, both the battery 3 and the DC charging port 11 are easily located in the center tunnel portion 25.

Figure 6:
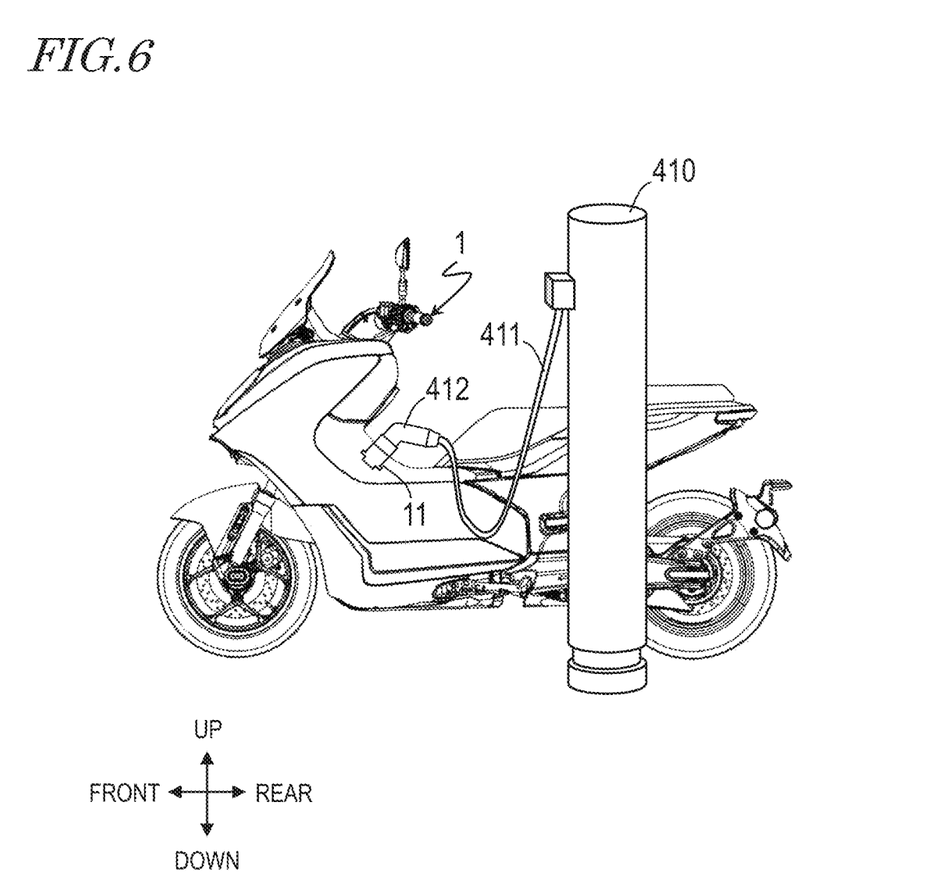
FIG. 6 is a view illustrating how a battery 3 of a straddled electric vehicle 1 according to a preferred embodiment of the present invention may be charged by using DC current.

FIG. 6 is a view illustrating how the battery 3 of the two-wheeled electric vehicle 1 may be charged by using a DC current. As an example of an external power source that outputs a DC current to charge the battery 3, FIG. 6 illustrates a charging station (also referred to as a charging spot). This charging station 410 may be installed, for example, in a parking lot of a commercial facility. A power supply connector 412 is provided at one end of a cable 411 extending from the charging station 410. Charging is performed by connecting the power supply connector 412 to the DC charging port 11 of the two-wheeled electric vehicle 1. The center tunnel portion 25 is located at a position that is accessible to the rider. Since the DC charging port 11 is located in the center tunnel portion 25, the rider is able to easily perform the charging.

In a preferred embodiment of the present invention, the DC charging port 11 and the AC charging port 12 are spaced apart from each other. With reference to FIG. 1, for example, along the vehicle front-rear direction, the AC charging port 12 is forward of the head pipe 22, and the DC charging port 11 is rearward of the head pipe 22. Since the DC charging port 11 and the AC charging port 12 are spaced apart from each other, the rider is able to easily distinguish the two kinds of charging ports from each other. With this, for example, erroneous insertion of the charging connectors is significantly reduced or prevented.

In addition, during a parking maneuver, the two-wheeled electric vehicle 1 is parked generally by being advanced into a parking space. Since the AC charging port 12 is located at the front side of the two-wheeled electric vehicle 1, the charging connector installed in the parking space is easily connected to the AC charging port 12.

Figure 7:
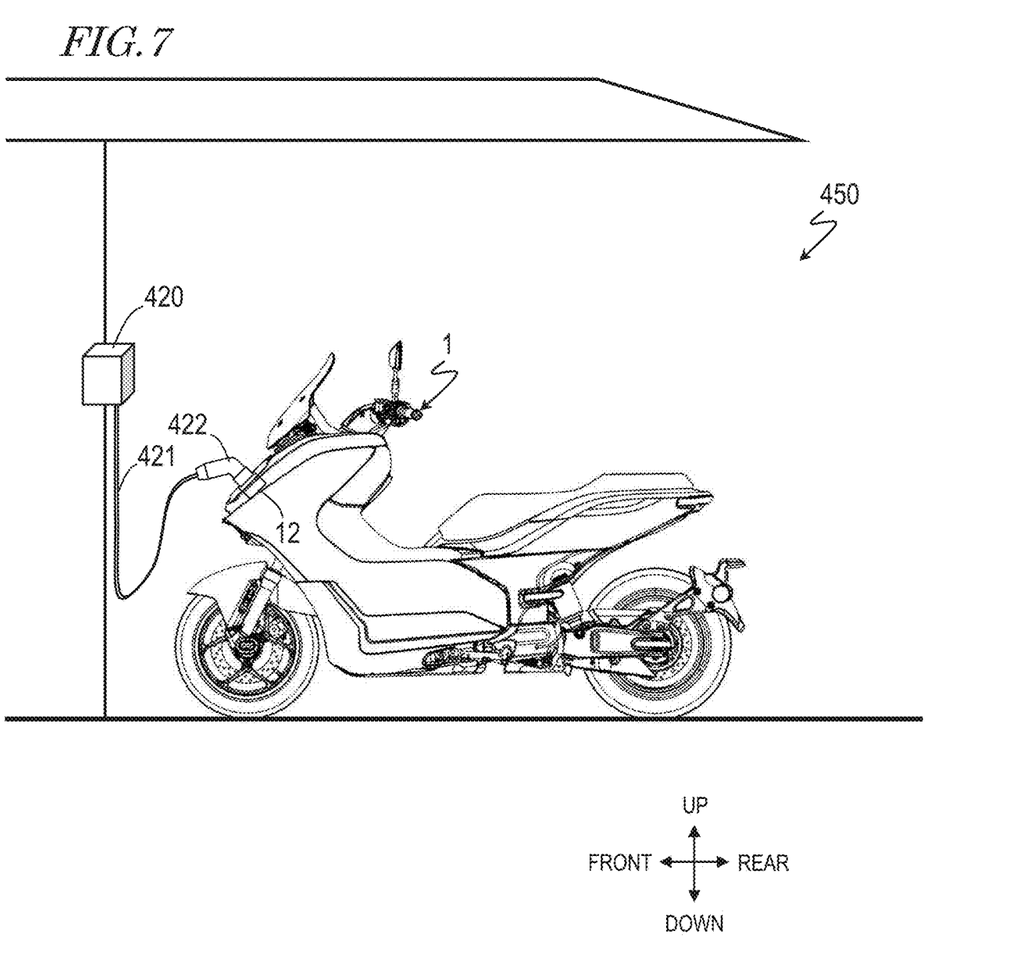
FIG. 7 is a view illustrating how a battery 3 of a straddled electric vehicle 1 according to a preferred embodiment of the present invention may be charged by using AC current.

FIG. 7 is a view illustrating how the battery 3 of the two-wheeled electric vehicle 1 may be charged by using an AC current. As an example of an external power source that outputs the AC current to charge the battery 3, FIG. 7 illustrates an external power source 420 installed in a parking space 450 of a house. A power supply connector 422 is provided at one end of a cable 421 extending from the external power source 420. Charging is performed by connecting the power supply connector 422 to the AC charging port 12 of the two-wheeled electric vehicle 1. Note that a household power outlet (household AC-power source) may be used as the external power source 420.

When the AC charging port 12 extends through the front cowl 27, the AC charging port 12 is located at a relatively high position in the vehicle front portion. Thus, the rider is able to easily connect the power supply connector 422 to the AC charging port 12.

Generally, an AC current to be output from an external power source is not used for rapid charging. Thus, a relatively small current is supplied to the AC charging port 12. Since a thin harness having a small cross-sectional area may be used as the harness 45 that connects the AC charging port 12 and the onboard charger 4 to each other, a relative high degree of freedom in locating the harness 45 in the vehicle body 2 is obtained. As a result, it is relatively easy to locate the AC charging port 12 away from the battery 3.

Figure 8:
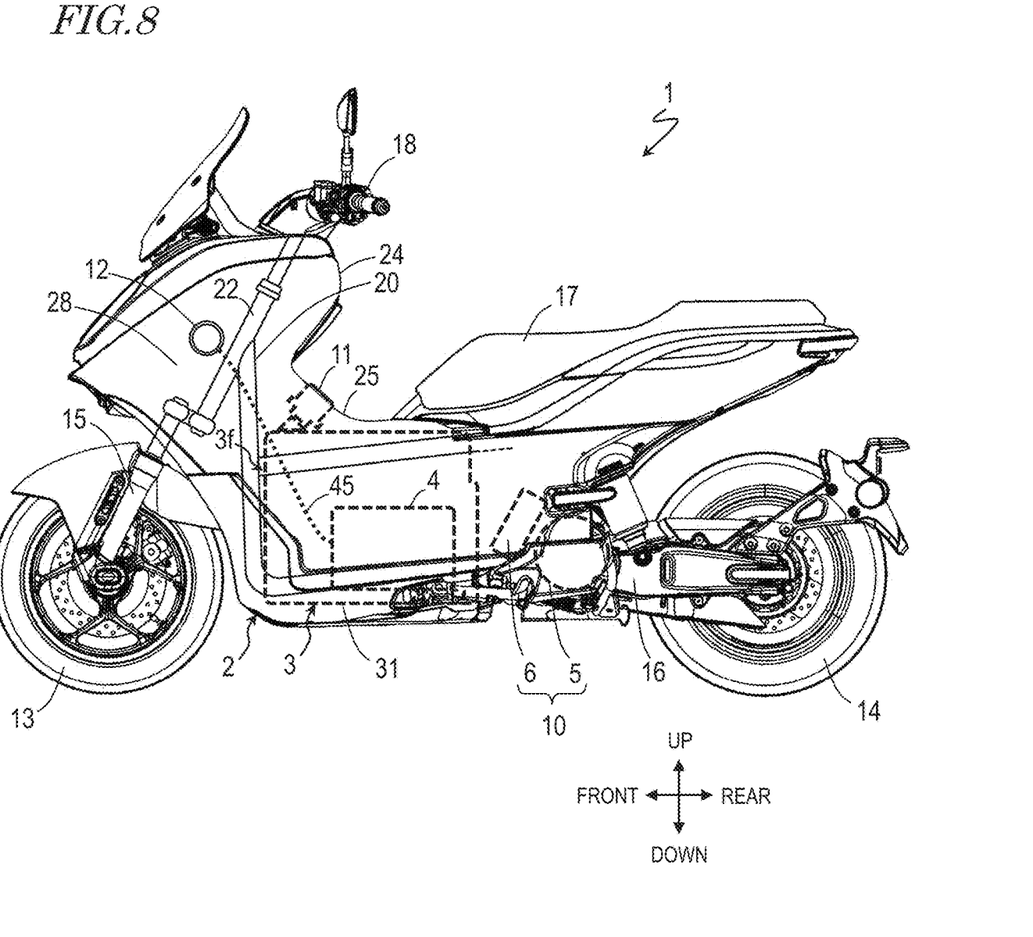
FIG. 8 is a view illustrating another example of the location of the AC charging port 12 according to a preferred embodiment of the present invention.

FIG. 8 is a view illustrating another example of the location of the AC charging port 12. In the example illustrated in FIG. 8, along the vehicle front-rear direction, the AC charging port 12 is forward of a front end portion 3f of the battery casing 31, and the DC charging port 11 is rearward of the front end portion 3f of the battery casing 31. For example, the AC charging port 12 may be provided through a leg cowl 28 of the body cover 24. In an implementation where the two-wheeled electric vehicle 1 is parked by being advanced into the parking space, the charging connector installed in the parking space is easily connected to the AC charging port 12 because the AC charging port 12 is located at the front side of the two-wheeled electric vehicle 1.

Figure 9:
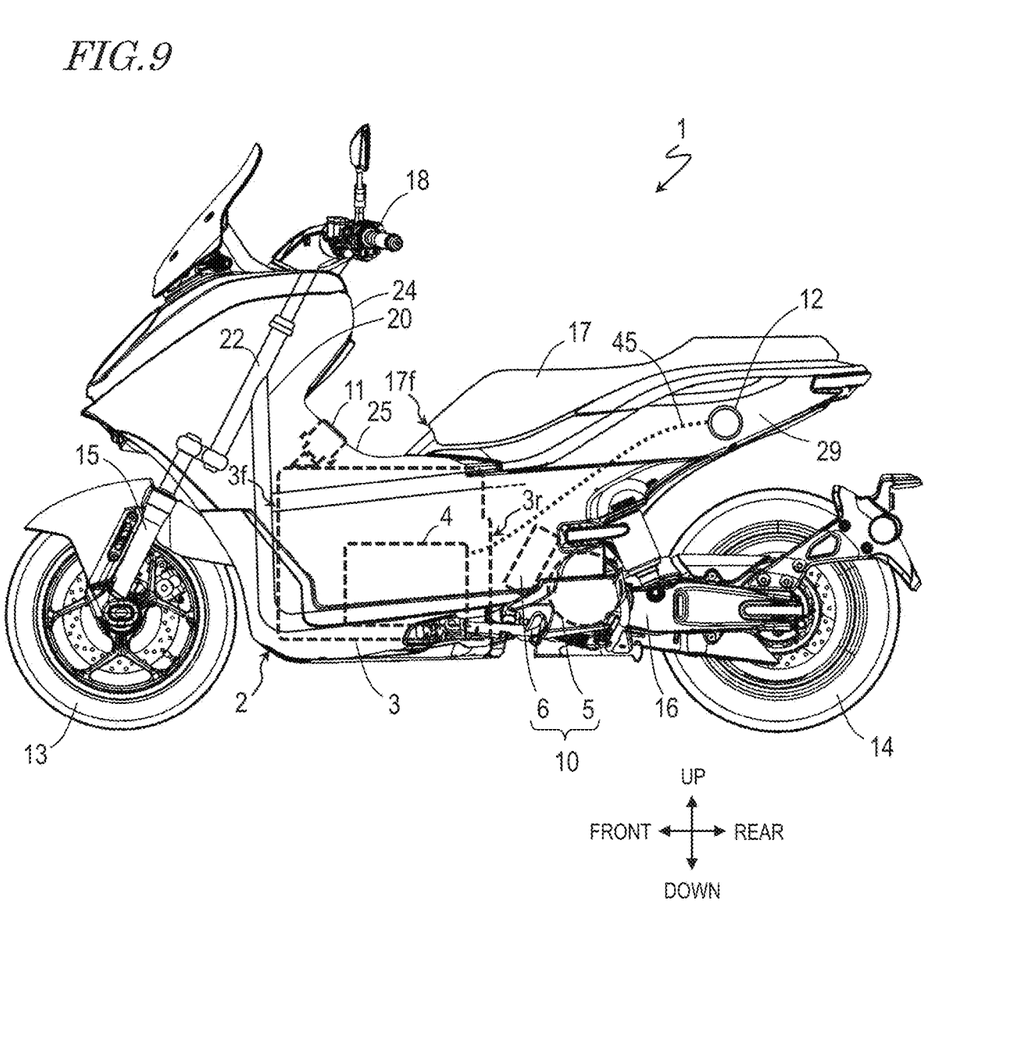
FIG. 9 is a view illustrating still another example of the location of the AC charging port 12 according to a preferred embodiment of the present invention.

FIG. 9 is a view illustrating still another example of the location of the AC charging port 12. In the example illustrated in FIG. 9, along the vehicle front-rear direction, the DC charging port 11 is forward of a front end portion 17f of the seat 17, and the AC charging port 12 is rearward of the front end portion 17f of the seat 17. For example, the AC charging port 12 may be provided through a seat cowl 29 of the body cover 24. Since the DC charging port 11 and the AC charging port 12 are spaced apart from each other, the rider is able to easily distinguish the two kinds of charging ports from each other. With this, for example, erroneous insertion of the charging connectors is significantly reduced or prevented. In addition, in the parking space, when the charging external power source is behind the two-wheeled electric vehicle 1, the charging connector is easily connected to the AC charging port 12.

As illustrated in FIG. 9, along the vehicle front-rear direction, the DC charging port 11 is located between the front end portion 3f of the battery casing 31 and a rear end portion 3r of the battery casing 31. As illustrated in FIG. 8 and FIG. 9, along the vehicle front-rear direction, the AC charging port 12 is forward of the front end portion 3f of the battery casing 31, or rearward of the rear end portion 3r of the battery casing 31. Since the DC charging port 11 is located near the battery 3, any harness with a large cross-sectional area is shortened, and the space required to accommodate the harness is reduced. Since the DC charging port 11 and the AC charging port 12 are spaced apart from each other, the rider is able to easily distinguish the two kinds of charging ports from each other.

In addition, the AC charging port 12 may be located in each of the front portion and the rear portion of the two-wheeled electric vehicle 1. With this, in the parking space, whether the charging external power source is in front of or behind the two-wheeled electric vehicle 1, the charging connector is easily connected to the AC charging port 12.

Thus, preferred embodiments of the present invention have been described above.

A straddled electric vehicle 1 according to a preferred embodiment of the present invention includes a wheel 14, an electric motor 5 to drive the wheel 14, a battery 3 to supply electric power to the electric motor 5, a DC charging port 11 to receive a connector 412 provided on a cable 411 extending from a first external power source 410 to output a DC current to charge the battery 3, and an AC charging port 12 to receive a connector 422 provided on a cable 421 extending from a second external power source 420 to output an AC current to charge the battery 3.

A first distance $L_{11}$ between the DC charging port 11 and the battery 3 is shorter than a second distance $L_{12}$ between the AC charging port 12 and the battery 3.

A straddled electric vehicle 1 according to a preferred embodiment of the present invention includes two kinds of charging ports, that is, the DC charging port 11 and the AC charging port 12. Generally, a DC current to be output from an external power source is used for rapid charging, such that a large current flows during the charging. For this reason, a thick harness having the large cross-sectional area is used as a harness 34 that connects the DC charging port 11 and the battery 3 to each other. Since the DC charging port 11 is located near the battery 3, the harness 34 with a large cross-sectional area is, and the space required to accommodate the harness 34 is reduced. In the straddled electric vehicle 1, a large number of components need to be provided within a limited space in the vehicle body. Thus, space saving is significantly advantageous. In addition, since the harness 34 having a large cross-sectional area is shortened, weight reduction and cost reduction are achieved.

In a preferred embodiment of the present invention, the battery 3 may have a battery casing 31, and the harness 34 extending from the DC charging port 11 may be directly inserted in the battery casing 31.

Generally, connectors capable of delivering a large current are expensive. Since no connector is provided to connect the harness 34 extending from the DC charging port 11 and the battery 3 to each other, cost reduction is achieved.

In a preferred embodiment of the present invention, the battery 3 may have a battery casing 31, along the vehicle front-rear direction, the DC charging port 11 may be located between a front end portion 3f of the battery casing 31 and a rear end portion 3r of the battery casing 31; and along the vehicle front-rear direction, the AC charging port 12 may be forward of the front end portion 3f of the battery casing 31, or rearward of the rear end portion 3r of the battery casing 31.

Since the DC charging port 11 is located near the battery 3, any harness 34 with a large cross-sectional area is shortened, and the space required to accommodate the harness 34 is reduced.

Since the DC charging port 11 and the AC charging port 12 are spaced apart from each other, the rider is able to easily distinguish the two kinds of charging ports from each other. With this, for example, erroneous insertion of the charging connectors is significantly reduced or prevented.

In a preferred embodiment of the present invention, the straddled electric vehicle 1 may further include a body frame 20 including a head pipe 22, and along the vehicle front-rear direction, the AC charging port 12 may be forward of the head pipe 22, and along the vehicle front-rear direction, the DC charging port 11 may be rearward of the head pipe 22.

Since the DC charging port 11 and the AC charging port 12 are spaced apart from each other, the rider is able to easily distinguish the two kinds of charging ports from each other. With this, for example, erroneous insertion of the charging connectors is significantly reduced or prevented.

In addition, during a parking maneuver, the straddled electric vehicle 1 is parked generally by being advanced into a parking space. Since the AC charging port 12 is located at the front side of the straddled electric vehicle 1, the charging connector installed in the parking space is easily connected to the AC charging port 12.

In a preferred embodiment of the present invention, the straddled electric vehicle 1 may further include a first footboard 26L on which the rider rests a left foot, a second footboard 26R on which the rider rests a right foot, and a body cover 24 including a center tunnel portion 25 located between the first footboard 26L and the second footboard 26R along the vehicle width direction, the battery 3 may be located in the center tunnel portion 25; and the DC charging port 11 may be provided on the outer surface side of the center tunnel portion 25.

Since the DC charging port 11 is located near the battery 3, assembly of the DC charging port 11 and the battery 3 is reduced. With this, both the battery 3 and the DC charging port 11 are easily located in the center tunnel portion 25.

The center tunnel portion 25 is located at the position that is accessible to the rider. Since the DC charging port 11 is located in the center tunnel portion 25, the rider is able to easily charge the straddled electric vehicle 1.

In a preferred embodiment of the present invention, the straddled electric vehicle 1 may further include a front cowl 27 that covers a portion of the vehicle front portion; and the AC charging port 12 may extend through the front cowl 27.

During a parking maneuver, the straddled electric vehicle 1 is parked generally by being advanced into the parking space. Since the AC charging port 12 is located at a relatively high position of the vehicle front portion, the charging connector installed in the parking space is easily connected to the AC charging port 12.

In a preferred embodiment of the present invention, the battery 3 may have a battery casing 31; and along the vehicle front-rear direction, the AC charging port 12 may be forward of a front end portion 3f of the battery casing 31; and along the vehicle front-rear direction, the DC charging port 11 may be rearward of the front end portion 3f of the battery casing 31.

Since the DC charging port 11 and the AC charging port 12 are spaced apart from each other, the rider is able to easily distinguish the two kinds of charging ports from each other. With this, for example, erroneous insertion of the charging connectors is significantly reduced or prevented.

In addition, during a parking maneuver, the straddled electric vehicle 1 is parked generally by being advanced into the parking space. Since the AC charging port 12 is located at the front side of the straddled electric vehicle 1, the charging connector installed in the parking space is easily connected to the AC charging port 12.

In a preferred embodiment of the present invention, the straddled electric vehicle 1 may further include a seat 17 on which the rider is seated; and along the vehicle front-rear direction, the DC charging port 11 may be forward of a front end portion 17f of the seat 17; and along the vehicle front-rear direction, the AC charging port 12 may be rearward of the front end portion 17f of the seat 17.

Since the DC charging port 11 and the AC charging port 12 are spaced apart from each other, the rider is able to easily distinguish the two kinds of charging ports from each other. With this, for example, erroneous insertion of the charging connectors is significantly reduced or prevented.

In a preferred embodiment of the present invention, the straddled electric vehicle 1 may further include an onboard charger 4 to convert the AC current received by the AC charging port 12 to a DC current, and output the DC current to the battery 3.

With this, the battery 3 is charged by using the AC current received by the AC charging port 12.

Preferred embodiments of the present invention are useful particularly in the field of straddled electric vehicles that utilize an electric motor as their driving source.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddled electric vehicle comprising:
   a wheel;
   an electric motor to drive the wheel;
   a battery to supply electric power to the electric motor;
   a DC charging port to receive a connector provided on a cable extending from a first external power source to output a DC current to charge the battery;
   an AC charging port to receive a connector provided on a cable extending from a second external power source to output an AC current to charge the battery; and
   a body frame including a head pipe; wherein
   a first distance between the DC charging port and the battery is shorter than a second distance between the AC charging port and the battery;
   along a vehicle front-rear direction, the AC charging port is forward of the head pipe; and
   along the vehicle front-rear direction, the DC charging port is rearward of the head pipe.

2. The straddled electric vehicle of claim 1, wherein the battery includes a battery casing, and a harness extending from the DC charging port is directly inserted in the battery casing.

3. The straddled electric vehicle of claim 1, wherein
   the battery includes a battery casing;
   along the vehicle front-rear direction, the DC charging port is between a front end portion of the battery casing and a rear end portion of the battery casing; and
   along the vehicle front-rear direction, the AC charging port is forward of the front end portion of the battery casing.

4. The straddled electric vehicle of claim 1, further comprising:
   a first footboard on which a rider is able to rest a left foot;
   a second footboard on which the rider is able to rest a right foot; and
   a body cover including a center tunnel portion between the first footboard and the second footboard along a vehicle width direction; wherein
   the battery is located in the center tunnel portion; and
   the DC charging port is located on an outer surface side of the center tunnel portion.

5. The straddled electric vehicle of claim 1, further comprising:
   a front cowl to cover a portion of a vehicle front portion; wherein
   the AC charging port extends through the front cowl.

6. The straddled electric vehicle of claim 1, wherein
   the battery includes a battery casing;
   along the vehicle front-rear direction, the AC charging port is forward of a front end portion of the battery casing; and
   along the vehicle front-rear direction, the DC charging port is rearward of the front end portion of the battery casing.

7. The straddled electric vehicle of claim 1, further comprising:
   a seat on which a rider is able to sit; wherein
   along the vehicle front-rear direction, the DC charging port is forward of a front end portion of the seat.

8. The straddled electric vehicle of claim 1, further comprising an onboard charger to convert the AC current received by the AC charging port to a DC current, and output the DC current to the battery.

* * * * *